United States Patent Office 3,660,346
Patented May 2, 1972

3,660,346
FLAME-RETARDED COMPOSITIONS AND
ADDITIVE SYSTEMS THEREFOR
Roy A. Gray and Harold R. Deck, Bartlesville, Okla., assignors to Phillips Petroleum Company
No Drawing. Filed Aug. 14, 1970, Ser. No. 63,915
Int. Cl. C08k 1/24; C09k 3/28
U.S. Cl. 260—41
10 Claims

ABSTRACT OF THE DISCLOSURE

Fire-retardant compositions of normally flammable organic materials are provided by admixing with said materials an additive system consisting essentially of (A) at least one bromine-containing organic compound having a bromine content of at least 30 weight percent, (B) at least one paracyclophane compound of the formula

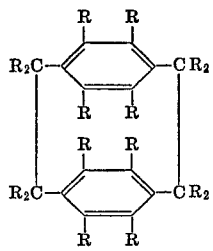

wherein each R is selected from hydrogen, chlorine, bromine and alkyl radicals having 1 to 4 carbon atoms, and optionally (C) antimony trioxide.

---

It is known that readily flammable organic materials can be made difficultly flammable by the addition thereto of halogen compounds. Such flame-retarded plastic compositions are important, especially for the production of electrical insulating coatings which find application such as in house wiring, for small appliances, electronic equipment wire insulation, jacketing, and the like.

However, in rendering organic materials such as olefin polymers fire-retardant or difficultly flammable, it is desirable that physical properties of the host material not be significantly altered as a result of the addition of the flameproofing agents. Accordingly, it is highly desirable that a retardant composition be provided which will effect the desired flame retardancy to the organic material at the lowest possible levels of addition.

In addition, in some instances it is desirable that the flame-retarded compositions be capable of being processed at elevated temperatures.

It is thus an object of this invention to provide novel flame-retarding additive systems which permit the reduction of the retardant level otherwise required for rendering the organic material self-extinguishing or nonburning.

Another object of this invention is to provide novel flame-retarding organic material compositions in which the physical properties of the organic material rendered flame-retardant are not significantly altered.

A further object of the invention is to provide a flame-retardant polymeric composition which is processable at elevated temperatures.

Other aspects, objects and the several advantages of the invention will be apparent to those skilled in the art from the following discussion and the appended claims.

In accordance with this invention, we have discovered that the retardant additive level can be substantially reduced in rendering normally flammable organic materials fire-retardant by utilizing an additive system which comprises (A) at least one bromine-containing organic compound having a bromine content of at least 30 weight percent, preferably at least 40 weight percent, and (B) a paracyclophane compound of the formula

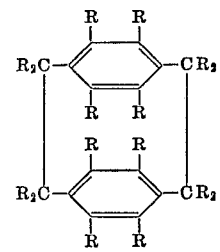

where each R is selected from hydrogen, chlorine, bromine, and alkyl radicals having 1 to 4 carbon atoms. If desired, antimony trioxide (C) can be used in conjunction with additives (A) and (B) to provide additional flame retardancy.

We have also discovered that use of the additive system of this invention provides a flame-retarded composition which is relatively stable at elevated temperatures thus, in turn, permitting the use of the composition at higher processing temperatures.

While the additive systems of this invention are particularly suitable for rendering polypropylene flame-retardant, it is to be understood that the additive systems of the invention are broadly applicable to normally flammable organic materials, i.e., host materials, including polymeric materials, cellulosic materials, natural fibers, regenerated fibers, man-made fibers, man-made resins, and the like. Specific examples of such materials are wood, linen and jute fabrics, flax, silk, wool and cotton fibers, rayon, nylon, vinyls or acrylics. Other examples of suitable polymeric compounds are olefin polymers and copolymers such as those of ethylene and butene, polyisobutylene, polymers of monomers comprising at least one of conjugated diene, preferably having 4 to 10 carbon atoms per molecule, inclusive, monovinyl-substituted aromatic compounds, preferably having 8 to 12 carbon atoms per molecule, inclusive, acrylonitrile, methyl acrylate and methyl methacrylate, preferably homopolymers of butadiene, isoprene, decadiene, styrene, vinylnaphthalene, acrylonitrile, methyl acrylate and methyl methacrylate; and copolymers (random, block or graft) of butadiene and styrene, of butadiene, styrene and acrylonitrile, of acrylonitrile and vinylpyridine, and of acrylonitrile and vinyl chloride. Blends or mixtures of the above compositions can also be used in this invention.

The bromine-containing organic compounds suitable as Component (A) of the additive system include organic bromides conventionally employed as flame-retarding or flameproofing agents e.g. disclosed in U.S. 3,441,524. They preferably contain at least 4 carbon atoms and have at least 2 bromine atoms attached to the carbon atoms. Those organic bromides are particularly suitable which are substantially non-volatile and have little or no disagreeable odor. Organic bromides containing a plurality of bromine atoms in an aliphatic or cycloaliphatic radical are very suitable.

In one presently preferred embodiment of this invention, Component A of the additive system is a compound of the formula

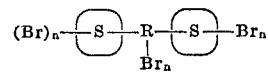

wherein the circles represent cycloalkyl groups having 5 to 8 carbon atoms in the ring, R is a saturated divalent acyclic hydrocarbon having 1 to 4 carbon atoms, and the values of each $n$ are selected such that the total bromine content of the compound is in the range of 30 to 90 weight percent.

A presently preferred specie of these bromine-containing organic compounds is 1,2 - dibromo - 1,2 - bis(3,4-dibromocyclohexyl)ethane. Mixtures of bromine-containing organic compounds can be employed.

Examples of paracyclophane compounds of the Formula B that can be used in the additive system of this invention are those in which each R is selected from hydrogen, chlorine, bromine, methyl, ethyl, propyl, isopropyl, butyl, isobutyl, sec-butyl and tert-butyl. The presently preferred compound of Formula B is that in which each R is hydrogen, i.e., unsubstituted paracyclophane. Mixtures of paracyclophane compounds can be employed.

The additive system of this invention can be prepared by mixing the bromine-containing organic compound with the paracyclophane compound. Optionally, antimony trioxide can be included in the mixture. Although larger amounts can be employed, the additive system generally is used at the lowest level which will provide the desired degree of flame-retardancy and which will produce the least change in the physical properties of the host material. In terms of parts by weight per hundred parts by weight of host material, the bromine-containing organic compound generally is used in an amount of about 0.7–20 parts, preferably 0.8–3 parts; the paracyclophane compound generally is used in an amount of about 0.5–20 parts, preferably 0.6–3 parts; and antimony trioxide generally is used in an amount of 0–20 parts, preferably 0–3 parts.

The upper limit of total additive incorporated into any normally flammable organic material will vary with each host material. However, for one presently preferred embodiment of this invention, the preferred ranges listed above are most applicable to polypropylene.

The production of the flame-retarded compositions can be carried out in various manners. For example, intimate mixtures of thermoplastic composition and flame-retarding agents according to this invention can be prepared by mixing the composition and the flame-retarding agents at an elevated temperature in an extrusion press or a kneader. When the components of the flame-retarding agents are soluble in a common solvent, they can be dissolved in the solvent, the solution admixed with the polymer, and the solvent subsequently removed. In the case of granular or beadlike plastic compositions, the surface of the granule may be coated.

It is to be understood that the mixtures of this invention also can have the usual fillers, dyes, pigments, plasticizers, antistatic agents, stabilizing agents, and the like, as well as antimony trioxide, incorporated therein, if desired. These compounds are well known in the art and for the sake of brevity will not be repeated.

The invention is demonstrated in the following examples, which are not to be construed as limiting the invention thereto.

The parts specified in the examples are parts by weight per 100 parts of polymer (php.).

EXAMPLE I

Into commercial polypropylene having a melt flow of about 4.0 grams/10 minutes (ASTM D 1238–65T, Condition L) was incorporated 0.3 php. of Irganox 1010 (tetrakis[3 - (3,5-di-tert-butyl-4-hydroxyphenyl)propionyloxymethyl]methane) antioxidant, and the resulting mixture was dry blended with various levels of the components of the fire-retarding system of this invention at 325–350° F. on a two-roll mill. The resulting blends were compression molded at 350° F. into sheets ⅛-inch thick from which samples were cut and tested for burning characteristics by the method of ASTM D 635–63.

The formulations used and the results obtained are shown in the table below:

| Sample No. | Additives, php. | | | Burning classification |
|---|---|---|---|---|
| | Br₆BCE* | Sb₂O₃ | Para-cyclophane | |
| 1 | 1.25 | 1 | 1 | Self-extinguishing. |
| 2 | 1 | 1 | 1 | Do. |
| 3 | 0.8 | 0.2 | 0.8 | Non-burning. |
| 4 | 0.8 | 0.4 | 0.6 | Do. |
| 5 (control) | 0.6 | 0.4 | 0.8 | Burning. |
| 6 (control) | 0.8 | 0.6 | 0.4 | Do. |
| 7 | 1.25 | 0 | 2 | Non-burning. |
| 8 (control) | 1.25 | 0 | 0 | Burning. |
| 9 (control) | 1 | 1 | 0 | Do. |

* 1,2-dibromo-1,2-bis(3,4-dibromocyclohexyl)ethane.

The above data show that polypropylene-containing additives as shown for samples 1–4 and 7 were rendered non-burning or self-extinguishing in contrast with the burning character of control samples 5, 6, 8 and 9, all of which were outside the scope of the invention.

EXAMPLE II

Into commercial polypropylene as described in Example I was incorporated 0.3 php. of Irganox 1010. The resulting mixture was blended with 0.8 php. 1,2-dibromo-1,2-bis(3,4-dibromocyclohexyl)ethane, 0.2 php. antimony trioxide, and 0.8 php. paracyclophane. The polymer formulation was held at the temperature indicated below for 10 minutes, then cooled quickly, after which the melt flow was determined according to ASTM D 1238–65T, Test Condition L. The following results were obtained:

| Melt flow, grams/10 minutes: | ° F. |
|---|---|
| 5.38 | 440 |
| 6.27 | 460 |
| 9.76 | 480 |
| 16.96 | 500 |

The melt flow values indicate that satisfactory processing of the additive-containing polymer at elevated temperatures can be achieved with relatively little decomposition of the polymer.

The additive system of this invention is prepared by mixing compounds of the Formulas A and B as defined above in amounts such that the weight ratio of the compound of Formula A to the compound of Formula B is in the range of 0.5:1 to 4:1, preferably 1:1 to 2:1. When antimony trioxide (C) is additionally present, the additive system is formulated by mixing the components in amounts such that the weight ratio of (A) to (B)+(C) is in the range of 0.5:1 to 4:1, preferably 1:1 to 2:1, and the weight ratio of (B) to (C) is in the range of 0.1:1 to 10:1.

Reasonable variations and modifications of this invention can be made, or followed, in view of the foregoing disclosure without departing from the spirit and scope thereof.

We claim:

1. A flame-retardant additive system which consists essentially of (A) at least one bromine-containing organic flame-retardant compound having a bromine content of at least 30 weight percent, said compound being an aliphatic or cycloaliphatic organic compound having at least 4 carbon atoms and at least 2 bromine atoms, and (B) a paracyclophane compound of the formula

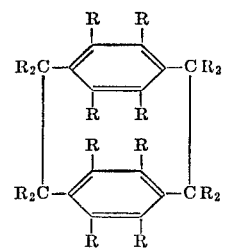

wherein each R is selected from hydrogen, chlorine, bromine, and alkyl radicals having 1 to 4 carbon atoms, and wherein the weight ratio of (A) to (B) is in the range of 0.5:1 to 4:1.

2. A flame-retardant system according to claim 1 wherein there is additionally present (C) antimony trioxide and wherein the weight ratio of (A) to (B+C) is in the range of 0.5:1 to 4:1 and the weight ratio of (B) to (C) is in the range of 0.1:1 to 10:1.

3. A flame-retardant additive system according to claim 1 wherein (A) is a compound of the formula

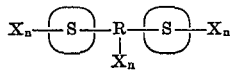

in which the circles represent cycloalkyl groups having 5 to 8 carbon atoms in the ring, X represents bromine substituted on the carbon atoms, R is a saturated divalent acyclic hydrocarbon having 1 to 4 carbon atoms and the values of each $n$ are selected such that the total halogen content of the compound is in the range of 30 to 90 weight percent.

4. A flame-retardant system according to claim 1 wherein (A) is 1,2-dibromo-1,2-bis(3,4-dibromocyclohexyl)ethane and (B) is paracyclophane.

5. A flame-retardant system according to claim 2 wherein (A) is 1,2-dibromo-1,2-bis(3,4-dibromocyclohexyl)ethane and (B) is paracyclophane.

6. A flame-retardant composition comprising a normally flamamble organic composition having admixed therein from 0.7 to 20 parts per hundred parts organic composition of (A) at least one bromine-containing organic flame-retardant compound having a bromine content of at least 30 weight percent said compound being an aliphatic or cycloaliphatic organic compound having at least 4 carbon atoms and at least 2 bromine atoms, and 0.5 to 20 parts per hundred parts said organic composition of (B) a paracyclophane compound of the formula

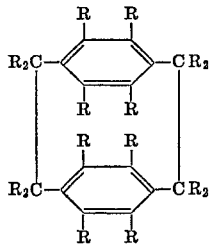

where each R is selected from hydrogen, chlorine, bromine, and alkyl radicals having 1 to 4 carbon atoms, and wherein the weight ratio of (A) to (B) is in the range of 0.5:1 to 4:1.

7. A flame-retardant composition according to claim 6 wherein (A) is a compound of the formula

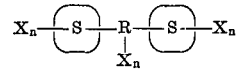

in which the circles represent cycloalkyl groups having 5 to 8 carbon atoms in the ring, X represents bromine substituted on the carbon atoms, R is a saturated divalent acyclic hydrocarbon having 1 to 4 carbon atoms and the values of each $n$ are selected such that the total halogen content of the compound is in the range of 30 to 90 weight percent.

8. A composition according to claim 6 wherein there is additionally present from 0 to 20 php. of (C) antimony trioxide.

9. A composition according to claim 6 wherein said organic composition is polypropylene, (A) is 1,2-dibromo - 1,2 - bis(3,4-dibromocyclohexyl)ethane and (B) is paracyclophane.

10. A composition according to claim 8 wherein said organic composition is polypropylene, (A) is 1,2-dibromo-1,2-bis(3,4-dibromocyclohexyl)ethane and (B) is paracyclophane.

References Cited

UNITED STATES PATENTS

| | | | |
|---|---|---|---|
| 3,141,860 | 7/1964 | Sauer et al. | 260—45.7 R |
| 3,198,844 | 8/1965 | Errede | 260—668 R |

OTHER REFERENCES

Lindemann, Robert F.: Flame Retardants, in I & EC, vol. 61, No. 5, May 1969, p. 72.

MORRIS LIEBMAN, Primary Examiner

J. H. DERRINGTON, Assistant Examiner

U.S. Cl. X.R.

106—15 FP; 117—136; 252—8.1; 260—37 N, 41.5 R, 45.7 R